(12) United States Patent
Virmani et al.

(10) Patent No.: US 10,902,497 B1
(45) Date of Patent: Jan. 26, 2021

(54) METHOD AND SYSTEM FOR PROCESSING REQUESTS IN A MESSAGING PLATFORM

(71) Applicant: Twitter, Inc., San Francisco, CA (US)

(72) Inventors: Ashish Virmani, San Francisco, CA (US); Peter Charles Martucci, III, San Francisco, CA (US); Sratha Saengsuwarn, San Francisco, CA (US); Yiting Bian, San Francisco, CA (US); Matthew Gadda, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 861 days.

(21) Appl. No.: 14/835,493

(22) Filed: Aug. 25, 2015

Related U.S. Application Data

(60) Provisional application No. 62/041,435, filed on Aug. 25, 2014.

(51) Int. Cl.
| | |
|---|---|
| *G06Q 30/00* | (2012.01) |
| *G06Q 30/06* | (2012.01) |
| *G06Q 10/08* | (2012.01) |
| *G06Q 50/00* | (2012.01) |

(52) U.S. Cl.
CPC ....... *G06Q 30/0633* (2013.01); *G06Q 10/087* (2013.01); *G06Q 50/01* (2013.01)

(58) Field of Classification Search
CPC ... G06Q 30/0633; G06Q 10/087; G06Q 50/01
USPC .............................................. 705/26.1–27.2
See application file for complete search history.

(56) References Cited

U.S. PATENT DOCUMENTS

| | | | |
|---|---|---|---|
| 8,095,432 B1 | 1/2012 | Berman et al. | |
| 9,246,866 B1 | 1/2016 | Sanders | |
| 2013/0275264 A1* | 10/2013 | Lindenberg | G06Q 30/0603 705/26.41 |
| 2013/0290149 A1 | 10/2013 | Rashwan | |
| 2013/0332460 A1* | 12/2013 | Pappas | G06F 17/30705 707/740 |

(Continued)

OTHER PUBLICATIONS

Yadav, Manjit S.; "Social Commerce: A Contingency Framework for Assessing Marketing Potential." Journal of Interactive Marketing, vol. 27, Issue 4, 2013, pp. 311-323, ISSN 1094-9968, https://doi.org/10.1016/j.intmar.2013.09.001. (Year: 2013).*

(Continued)

*Primary Examiner* — Anand R Loharikar
(74) *Attorney, Agent, or Firm* — Fish & Richardson P.C.

(57) ABSTRACT

A method for purchasing processing requests on a messaging platform including obtaining a broadcast message from a first client associated with a first social networking account, making a first determination that the broadcast message includes a reference to an item, making a second determination, based at least in part of a perceived inventory count for item that a vendor associated with the messaging platform is able to supply the item, based on the second determination, generating a new broadcast message that includes a buy-now card associated with the item, transmitting the new broadcast message to a second client associated with a second social networking account, receiving, after transmitting the new broadcast message, a purchase request for the second client, wherein the purchase request specifies the item, and processing, by the messaging platform, the purchase request.

20 Claims, 7 Drawing Sheets

(56) References Cited

U.S. PATENT DOCUMENTS

2015/0302470 A1\* 10/2015 Dru .................... G06Q 30/0277
                                                        705/14.51

OTHER PUBLICATIONS

Khan et al., "Mining Customer Data for Decision Making Using New Hybrid Classification Algorithm," Publication of Little Lion Scientific R & D, Islamabad, Pakistan, May 15, 2011, vol. 27 No. 1, ISSN 1992-8645, 8 pages.

\* cited by examiner

METHOD AND SYSTEM FOR PROCESSING REQUESTS IN A MESSAGING PLATFORM

CROSS-REFERENCE TO RELATED APPLICATIONS

This application is a non-provisional patent application of U.S. Provisional Patent Application Ser. No. 62/041,435, filed on Aug. 25, 2014, and entitled: "Commerce in a Messaging Platform." Accordingly, this non-provisional patent application claims priority to U.S. Provisional Patent Application Ser. No. 62/041,435 under 35 U.S.C. § 119(e). U.S. Provisional Patent Application Ser. No. 62/041,435 is hereby incorporated by reference in its entirety.

BACKGROUND

Social network applications provide one avenue for vendors to advertise their products and services directly to individual consumers, although actual sales of the items traditionally take place in physical retail stores or via vendor or third-party websites. Social network applications provide a user with the ability to communicate with vendors and a variety of other users. The cross-section of functionality presents a unique opportunity to promote a sale to a user's friends and transact the sale inline with the user's communication.

SUMMARY

In general, in one aspect, one or more embodiments disclosed herein relate to a method for purchasing processing requests on a messaging platform, the method comprising: obtaining a broadcast message from a first client associated with a first social networking account; making a first determination that the broadcast message includes a reference to an item; making a second determination, based at least in part of a perceived inventory count for item that a vendor associated with the messaging platform is able to supply the item; based on the second determination, generating a new broadcast message that includes a buy-now card associated with the item; transmitting the new broadcast message to a second client associated with a second social networking account; receiving, after transmitting the new broadcast message, a purchase request for the second client, wherein the purchase request specifies the item; and processing, by the messaging platform, the purchase request.

In another aspect, one or more embodiments disclosed herein relate to a non-transitory computer readable medium comprising instructions, which when executed by a processor perform a method, the method comprising: obtaining a broadcast message from a first client associated with a first social networking account; making a first determination that the broadcast message includes a reference to an item; making a second determination, based at least in part of a perceived inventory count for item, that a vendor associated with the messaging platform is able to supply the item; based on the second determination, generating a new broadcast message that includes a buy-now card associated with the item; transmitting the new broadcast message to a second client associated with a second social networking account; receiving, after transmitting the new broadcast message, a purchase request for the second client, wherein the purchase request specifies the item; and processing, by the messaging platform, the purchase request.

In yet another aspect, one or more embodiments disclosed herein relate to a messaging platform, comprising: a processor; a data repository, and a broadcast module, when executed by the processor: obtains a broadcast message from a first client associated with a first social networking account; makes a first determination that the broadcast message includes a reference to an item; makes a second determination, based at least in part of a perceived inventory count for item, that a vendor associated with the messaging platform is able to supply the item; based on the second determination, generates a new broadcast message that includes a buy-now card associated with the item; and transmits the new broadcast message to a second client associated with a second social networking account; an order processing module, when executed by the processor, receives, after the new broadcast message has been transmitted, a purchase request for the second client, wherein the purchase request specifies the item; and processes the purchase request; a sales module, when executed by the processor: obtains, from a plurality of vendors, a plurality of offers corresponding to a plurality of offered items; and stores the plurality of offers in the data repository.

Other aspects of the invention will be apparent from the following description and the appended claims.

DETAILED DESCRIPTION

Figure 1:
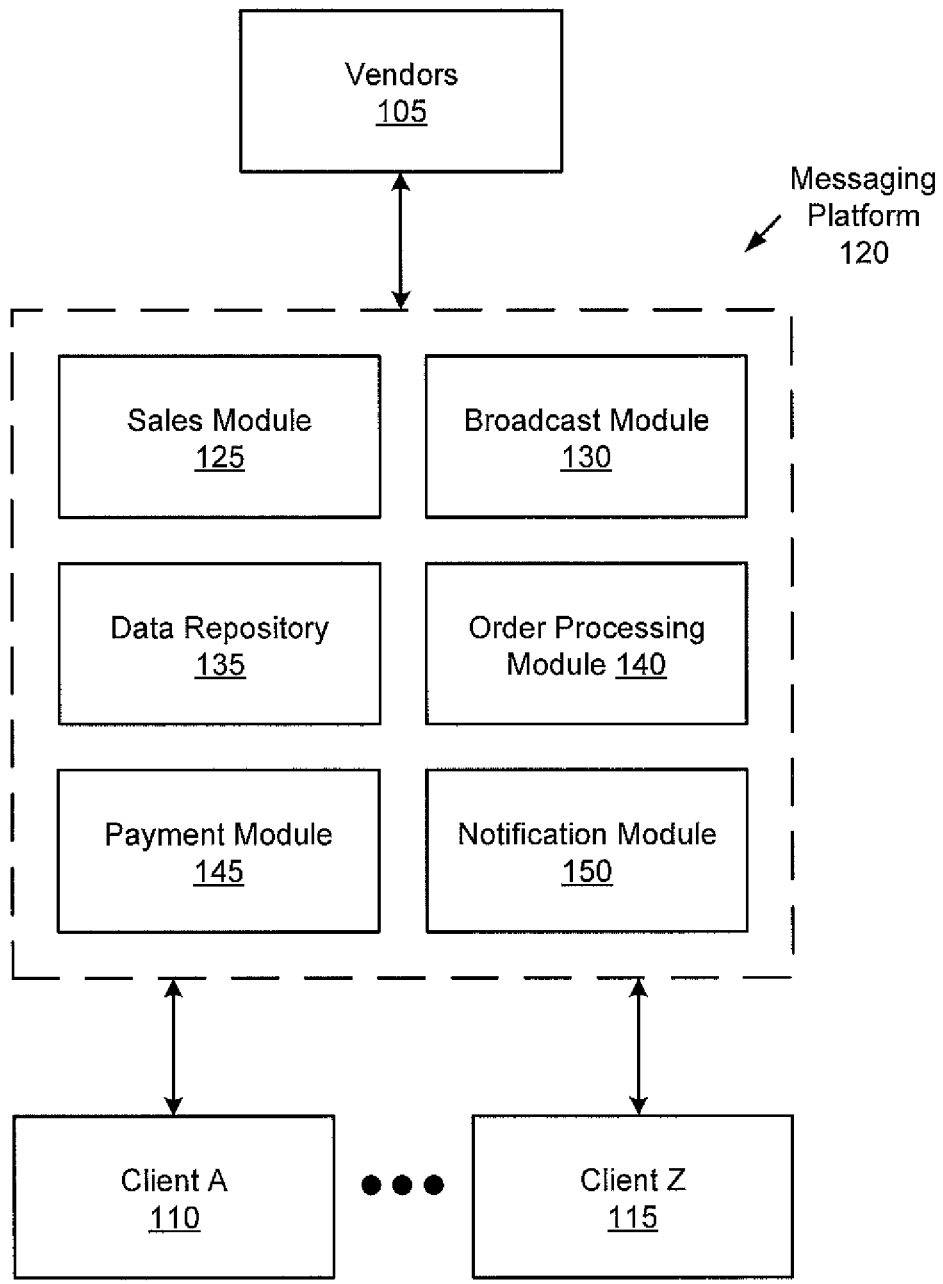
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention detect social network communications between users containing references to one or more goods or services commercially available for purchase. After detection, users may be presented with options to purchase the one or more goods or services within the social network interface, obviating the need to interface with third-party distribution sources via external websites, applications, or physical stores. Purchase options may be presented to a user in a broadcast message, direct message, etc. accompanied by information tailored to the user's social graph, account information, or other pertinent information.

FIG. 1 shows a schematic diagram of a system in accordance with one or more embodiments of the invention. As shown in FIG. 1, the system includes vendors (105), clients (110, 115), and a messaging platform (120) including a sales module (125), a broadcast module (130), a data repository (135), an order processing module (140), a payment module (145), and a notification module (150). Each of these components is described below.

In one or more embodiments of the invention, client A (110) and client Z (115) (collectively, "clients") are computing devices that are configured to interface with a messaging platform (120) (described below). Clients (110, 115) may enable a user to create broadcast messages and post the created broadcast messages to the messaging platform (120). Clients (110, 115) may also receive broadcast messages from the messaging platform (120) and display the broadcast messages. In one or more embodiments of the invention, clients (110, 115) include functionality to send user-initiated requests (e.g., purchase requests) or other requests to the messaging platform (120). In one or more embodiments of the invention, clients (110, 115) include functionality to initiate actions including, but not limited to: rebroadcasting a message, following a particular account associated with the messaging platform (120), liking or "favoriting" a message, replying to a message, selecting a purchase option in a component of a broadcast message, selecting a vote option in a component of a broadcast message, entering a bid to purchase a product in a component of a broadcast message, and selecting an audio/playback option in a component of a broadcast message.

Examples of a client (110, 115) may include, but are not limited to, a laptop computer, a desktop computer, a server computer, a netbook, a smart phone, a tablet computer, and any other computing device having communication capability with messaging platform (120). Clients (110, 115) may utilize any number of interfaces, including a web-based client, a Short Messaging Service (SMS) interface, an instant messaging interface, an e-mail based interface, an application programming interface (API) function-based interface, and/or any other interface capable of communicating (via a computer network) with one or more components of the messaging platform (120).

In one or more embodiments of the invention, vendors (105) are third-party business entities including product distributors and service providers. Vendors may contract to advertise and sell the vendors' products and/or services via the messaging platform (120) in accordance with embodiments of the invention. Vendors may provide the messaging platform (120), via one or more application programming interfaces (APIs), with offers for sale including offered items, descriptions, prices, duration of offers (i.e., time constraints), quantities available, quantity requirements for user purchases (i.e. quantity constraints), etc.

In one or more embodiments of the invention, the messaging platform (120) is a platform for facilitating real-time communication between one or more entities. For example, the messaging platform (120) may store millions of accounts of individuals, businesses, and/or other entities (e.g., pseudonym accounts, novelty accounts, etc.). One or more users of each account may use the messaging platform (120) to send messages to other accounts inside and/or outside of the messaging platform (120). The messaging platform (120) may be configured to enable users to communicate in "real-time", or converse with other users with a minimal delay and to conduct a conversation with one or more other users during concurrent sessions. In other words, the messaging platform (120) may allow a user to broadcast messages and may display the messages to one or more other users within a reasonable time frame so as to facilitate a live conversation between the users. Recipients of a message may have a predefined graph relationship with an account of the user broadcasting the message. In one or more embodiments of the invention, the user is not an account holder or is not logged in to an account of messaging platform (120). In this case, messaging platform (120) may be configured to allow the user to broadcast messages and/or to utilize other functionality of messaging platform (120) by associating the user with a temporary account or identifier.

In one or more embodiments of the invention, the messaging platform (120) includes may include (or be operatively connected to), a sales module (125), a broadcast module (130), a data repository (135), an order processing module (140), a payment module (145), and a notification module (150). Each of the aforementioned components may be implemented in separate computing devices (see e.g., FIG. 4). Alternatively, each of the components may be implemented on a single computing device. Each of these components is described below.

In one or more embodiments of the invention, the sales module (125) includes functionality to obtain data from vendors (105) corresponding to offers for sale ("offer data") (e.g., product information, SKUs, etc.) and previous sales of offered items ("sales data"). For example, the sales module (125) may obtain offer data and sales data input directly by a representative of a vendor (105) via a user interface. In one or more embodiments of the invention, the sales module (125) may obtain offer data and sales data indirectly by communicating with external computing resources operated and/or specified by vendors (105). For example, the sales module (125) may scrape a website or parse metadata tags from a web page to obtain sales data (i.e., item description, warranty information, offer expiration date, etc.). Types of offer data and sales data obtained by the sales module (125) may include, without limitation, files, text, images, audio, video, webpages, and/or any other data format. The sales module (125) includes functionality to store obtained offer data, sales data, and/or other data in the data repository (135). The sales module (125) includes functionality to track user accounts used to purchase an offered item and to update sales data for the offered item accordingly. The sales module (125), working in conjunction with the broadcast module (130) further includes functionality to determine an inventory count of an item for sale.

In one or more embodiments of the invention, the broadcast module (130) includes functionality to receive a broadcast message from a client (110, 115). The broadcast module (130) may receive the broadcast message in conjunction with a request to post the broadcast message to messaging platform (120). The broadcast message may include a text string entered by a user, one or more uniform resource locators (URLs) or other references, and/or any other content (e.g., images, video, audio) that can be included in a message posted to messaging platform (120).

In one or more embodiments of the invention, the broadcast module (130) includes functionality to identify, in the broadcast message, a reference to a commercial item (e.g., a product or a service). The reference may be, for example, a URL or other data pointing to a location accessible via a computer network. In one or more embodiments of the invention, the broadcast module (130) includes functionality to scrape a website corresponding to a URL included in a broadcast message to identify a commercial item. As another example, the reference may be text entered by the user describing a commercial item. In one or more embodiments of the invention, the broadcast module (130) includes functionality to parse and analyze broadcast message text using natural language processing to identify the commercial item.

In one or more embodiments of the invention, the broadcast module (130) includes functionality to match a commercial item that is referenced by a broadcast message with an offered item corresponding to an offer for sale stored in the data repository. The broadcast module (130) may match the referenced item with the offered item using, for example, a text string match, image match, metadata match, any other method, and/or any combination thereof.

In one or more embodiments of the invention, the broadcast module (130) includes functionality to post (i.e., send) a received broadcast message from an authoring account to one or more clients based on graph relationships between the authoring account and other accounts. In one or more embodiments of the invention, the broadcast message is modified by messaging platform (120) prior to posting. Specifically, the broadcast module (130) may send the broadcast message to one or more clients with additional content, formatting, and/or other data. For example, the broadcast message may be modified to include an image/video thumbnail, a product description, a title of an article or product review, an offer for sale by a vendor (105), and/or any other data. For example, the broadcast message may be modified by adding data and/or component(s) related to a commercial item referenced by the broadcast message.

In one or more embodiments of the invention, a component is a user interface element for use in a broadcast message. Examples of a component may include, but are not limited to, an e-commerce component, a trigger component associated with an action (e.g., initiating purchase of a product, selecting a message as a favorite, rebroadcasting a message, etc.), an audio playlist component, an article summary component, an image slideshow component, an image grid component, a chart component, and a map component.

In one or more embodiments of the invention, the broadcast module (130) includes functionality to send a broadcast message, one or more components, and/or sales data to a client (110, 115). For example, assume the broadcast module (130) receives a broadcast message referencing a commercial item. Moreover, assume the data repository (135) stores a sales offer for the commercial item. The broadcast module (130) may send the broadcast message, the offer for sale, a trigger component enabling a user to initiate purchase of the offered item, and sales data relating to prior purchases of the offered item. The broadcast module (130) may obtain sales data for the offered item from the data repository (135) and/or from an external source. The broadcast module (130) may send a subset of the sales data to a client, where the subset is selected based on the user account used to operate the client (i.e., the subset of sales data may be tailored to each recipient of the broadcast message). For example, the broadcast module (130) may send to a first user account a subset of sales data corresponding to other user accounts linked or otherwise associated with the first user account. For example, and without limitation, the other user accounts may have a graph relationship with the first user account, or the other user accounts may share similarities with the first user account. The subset of sales data may inform the first user that a certain number of associated users have purchased the offered item.

The trigger component is made available depending on the availability of the commercial item from the vendors (105). Specifically, depending on availability of the referenced commercial item from the vendors (105), the broadcast module (130) may broadcast the broadcast message as a buy-now card or as a product card. The buy-now card enables any user who sees the broadcast message to purchase the commercial item by clicking on the "Buy Now" button. The buy-now card may, as indicated above, include an image/video thumbnail, a product description, URL, a coupon, a title of an article or product review, an offer for sale by a vendor (105), and/or any other content. If no vendor (105) is available to supply the commercial item (e.g., there is no inventory available for the commercial item), the broadcast module (130) broadcasts the broadcast message as the product card. By clicking on the product card, a user is directed to an external page that is separate from the messaging platform (120). Similar to the buy-now card, the product card may include an image/video thumbnail, a product description, a coupon, a title of an article or product review, a URL to a vendor website, and/or any other content.

In one or more embodiments of the invention, the broadcast module (130) includes functionality to detect that sales data for an offered item has been updated at some time after a broadcast message and sales data have been sent to a client (110, 115). The broadcast module (130) may send updated sales data to a client such that the updated sales data is displayed on the client with the original broadcast message in place of the original sales data.

In one or more embodiments of the invention, the data repository (135) is any type of storage unit and/or device (e.g., random access memory, flash memory, a file system, database, collection of tables, or any other storage mechanism) for temporarily or permanently storing data. Further, the data repository (135) may include multiple different storage units and/or devices. The multiple different storage units and/or devices may or may not be of the same type or located at the same physical site.

In one or more embodiments of the invention, the order processing module (140) receives purchase requests from users via the buy-now card. The order processing module (140) is configured to place the purchase requests in an order queue for processing. The request may include any customization information such as a size, a quantity, and a timestamp associated with the request etc. More details regarding how a request is processed are described below.

In one or more embodiments of the invention, the payment module (145) works in conjunction with the order processing module (140) and includes functionality to transact a sale of a commercial item. The payment module (145) may transact a sale of an item in response to receiving a purchase request from a client. The payment module (145) may be configured to store payment information (i.e., credit/debit card number, bank account routing information, gift card number, etc.). Depending on activity associated with an account used to submit the request, the payment module (145) may request payment confirmation before proceeding with the transaction. For example, if a user has not been active on the messaging platform (120) for more than a predetermined period of time, the payment module (145) may request that the user input the last 4 digits of the default credit. For example, if a user is submitting the request via an unrecognized device, the payment module (145) may request that the user input new payment information. For example, if a user is modifying a shipping address, the payment module (145) may request that the user input new payment information. The payment module may also include other fraud detection mechanisms without departing from the invention.

In one or more embodiments of the invention, the notification module (150) is configured to notify the user whether the request has been fulfilled or not. If the request is not fulfilled, an error message is sent to the user in the form of, for example, text message, email, etc., indicating the reason for the failure. Examples of actions/events that could trigger the generation of such a message may include incorrect payment information, no inventory of the commercial item at the vendor remorse. If the request is fulfilled, a confirmation is sent to the user in the form of; for example, text message, email, etc., indicating an estimated delivery time (if applicable), delivery means, a tracking number associated with the delivery means, a return policy associated with the request, etc.

While FIG. 1 shows a configuration of components, other configurations may be used without departing from the scope of the invention. For example, various components may be combined to create a single component. As another example, the functionality performed by a single component may be performed by two or more components.

While various steps in the following flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 2A:
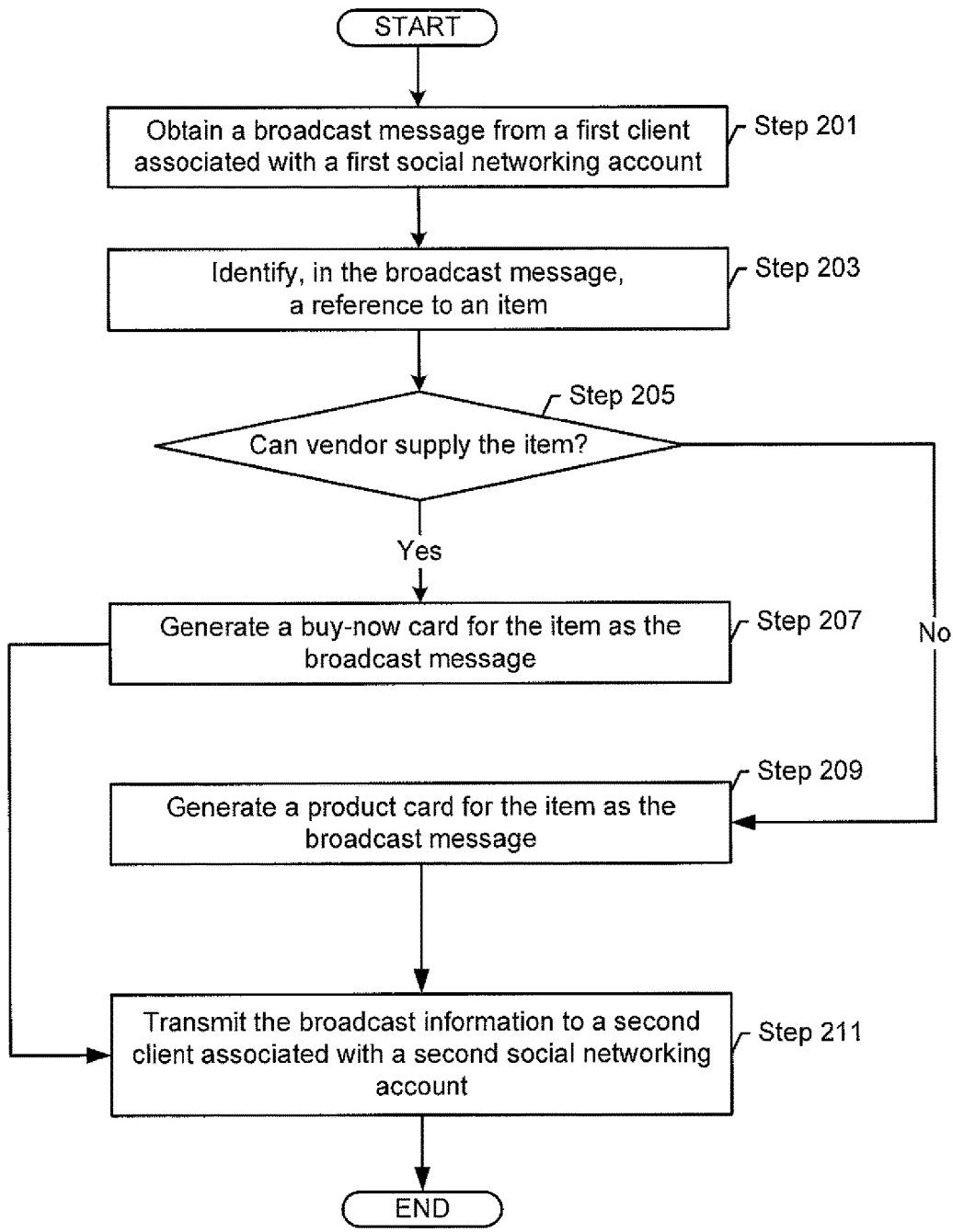
FIG. 2A shows a flowchart in accordance with one or more embodiments of the invention.

FIG. 2A shows a flowchart for displaying a broadcast message, in accordance with one or more embodiments of the invention. As will be discussed below in more details, the broadcast message may display a product card or a buy-now card, depending on the availability of the item from the vendors. One of ordinary skill in the art would appreciate that obtaining live inventory counts from vendors is difficult. This is because the inventory count is constantly changing and it occurs much slower than messages are processed on the messaging platform. Said another way, the messaging platform, at least in some embodiments, operates in a real-time or near real-time manner (as discussed above) often processing hundreds of thousands or millions of messages a second. In contrast, vendor systems are typically designed to process orders in a much slower manner. Accordingly, to ensure that user experience is not compromised, the messaging platform includes functionality to estimate the vendor inventory based on various information provided by the vendor (see e.g., FIGS. 2A-2C). Based on the estimates, the messaging platform includes functionality to determine whether to include a product card or a buy-now card for the item in the broadcast message. The messaging platform seeks to avoid providing a user with a buy-now card who then finds out that there is actually no inventory available when he or she decides to purchase the item.

Turning to FIG. 2A, in Step 201, a broadcast message from a first client associated with a first social networking account is obtained. In Step 203, a reference to an item is identified in the broadcast message. Those of skill in the art would appreciate that this can be accomplished using natural language processing techniques, key word matching, any other mechanism, or any combination thereof.

Figure 2B:
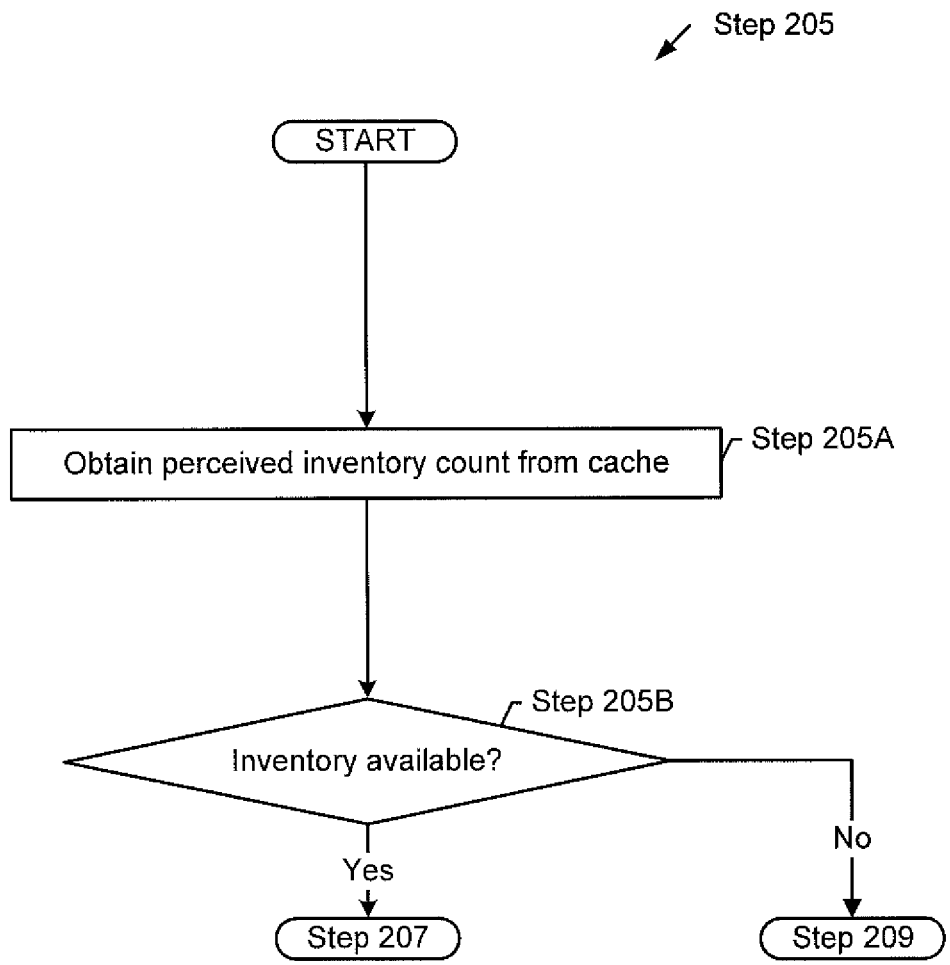
FIG. 2B shows a flowchart in accordance with one or more embodiments of the invention.

In Step 205, the messaging platform determines whether vendors can supply the item (more details regarding this particular step is described in reference to FIG. 2B). If the messaging platform determines that one or more vendors are able to supply the item, the method proceeds to Step 207. If the messaging platform determines that no vendor is able to supply the item, the method proceeds to Step 209. In another embodiment of the invention, the messaging platform makes the determination is step 205 using the perceived inventory count (see e.g., FIG. 2B) and other information related to the users (e.g., the users that will make purchases, via their client devices) past actions of the messaging platform. The other information (e.g., click-through rates on buy-now cards, click-through rates on product cards, etc.) may be used to determine whether to generate a product card or a buy-now card for a given user. Accordingly, there may be scenarios in which the number of broadcast messages generated with buy-now cards exceed the perceived inventory count. (See Example 3 below).

Continuing with the discussion of FIG. 2B, in Step 207, the messaging platform generates a buy-now card for the item. In one embodiment, the buy-now card may be a video clip showing the item. Appended to the buy-now card is a button "Buy Now." The user is able to purchase the item shown in the video clip if he or she interacts with the button. The buy-now card may also include information as described above with respect to FIG. 1.

In Step 209, the messaging platform displays a product card for the item. In one embodiment, the product card may be an image and a description of the item. The product card may be embedded with a uniform resource identifier (URI) or a mobile deep link that directs a user who interacts with the image to a vendor who may be able to supply the item.

In Step 211, the messaging platform transmits the broadcast message that includes either the buy-now card or the product card to a second client.

In one embodiment of the invention, the user that generated the broadcast message that was received in step 201 is to be transmitted to multiple clients, then the process in steps 205-211 are repeated for each such client. Accordingly, in this scenario, broadcast messages may be generated in response to the broadcast message received in step 201 may: (i) all have product cards, (ii) may either had a product card or a buy-now card (See e.g., Example 3 below); or (iii) all have product cards.

FIG. 2B shows a flowchart in accordance with one or more embodiments of the invention and clarifies Step 205 of FIG. 2A.

In Step 203 of FIG. 2A, a reference to an item is identified in the broadcast message. In Step 205A, a perceived inventory count is obtained. In one embodiment of the invention, the perceived inventory count is determined from information that is periodically received from the vendor(s). Inventory information from the vendor may obtained periodically, e.g., every 1 minute or 5 minutes, from the vendor. Inventory information from the vendor may also be obtained when the vendor processes a request to purchase the item (See e.g., FIG. 2C). In one embodiment of the invention, a time stamp is associated with the vendor information received from the vendor.

The messaging platform uses the above information to determine perceived inventory. The perceived inventory for a given item takes into account, at least: (i) the most recent inventory information received from the vendor (as determined by the time stamps associated with the inventory information) and (ii) the number of purchase requests have been queued (e.g., placed in the order queue) since the last inventory information received from the vendor. For example, if the inventory information from the invention at T=1 is 1000 and the current time is T=5, then the perceived inventory by the messaging platform may be 1000−[number of purchase requests received between T=1 and T=5]. Additional examples related to the perceived inventory count are described below.

Continuing with the discussion of FIG. 2B, in Step 205B, the messaging platform determines whether inventory is available based on the perceived inventory count. If the messaging platform determines that inventory is available, the method proceeds to Step 207. If the messaging platform determines that the inventory is not available, the method proceeds to Step 209. Those skilled in the art will appreciate that the because of vendor systems are not providing real-time inventory information to the messaging platform, the messaging platform may determine that there is not inventory for a particular item at the vendor when in-fact there is inventory available at the vendor.

Figure 2C:
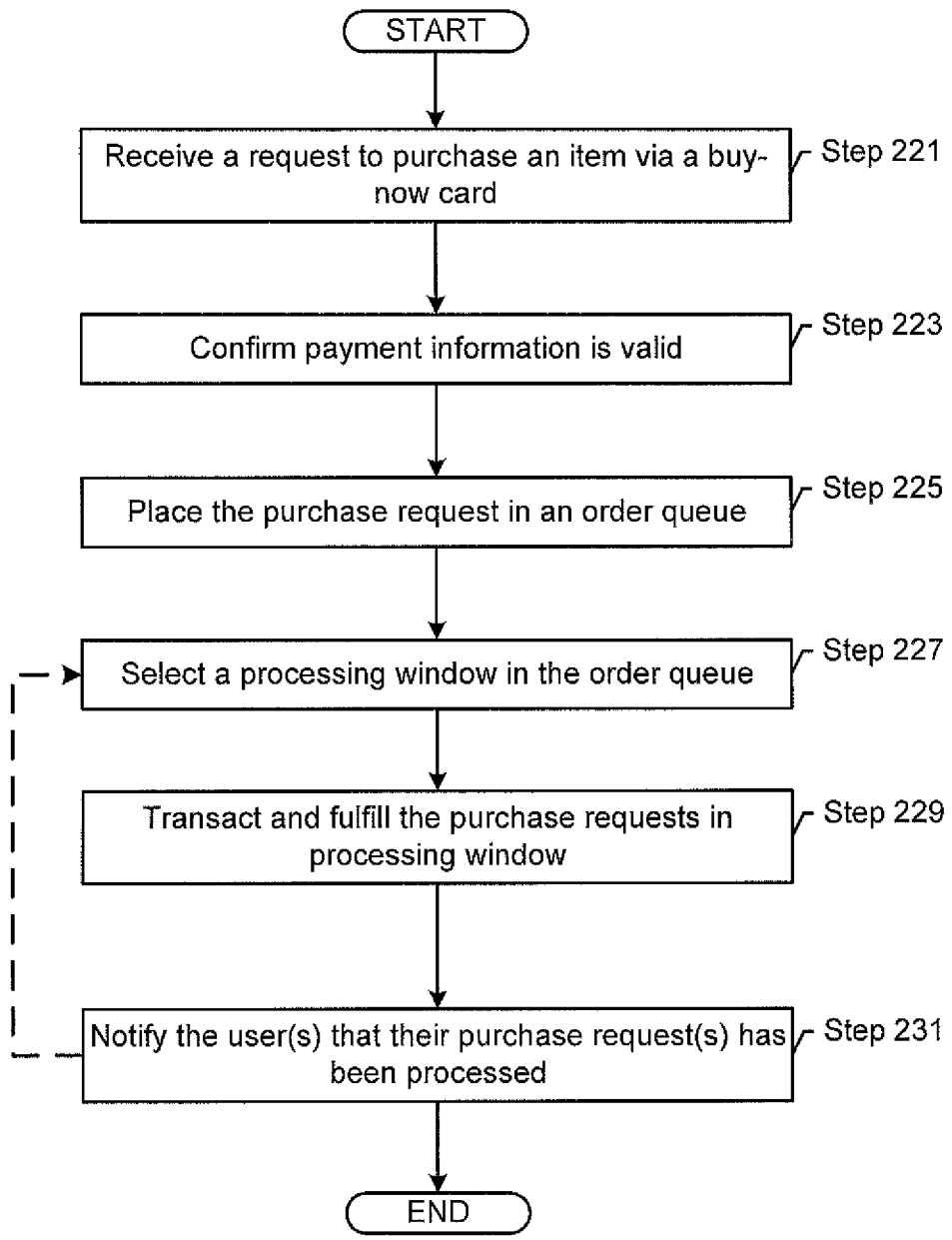
FIG. 2C shows a flowchart in accordance with one or more embodiments of the invention.

FIG. 2C shows a flowchart in accordance with one or more embodiments of the invention. More specifically, FIG. 2C shows a flowchart for processing a purchase request received when a user selects a component in the buy-now card to trigger the purchase of the item shown (or referenced in the buy-now card).

In Step 221, a user interacts with, for example, a buy-now button of a buy-now card for an item referenced in a broadcast message. The result of the interaction is the generation of a purchase request on the client that is then transmitted to the messaging platform.

In Step 223, the messaging platform receives the purchase request, identifies the entity that has issued the purchase request, obtains the payment information associated with the entity, and confirmnns that the payment information is valid. Or, if the payment information is not accurate (or otherwise invalid), measures are taken by the payment module to solicit new payment information from the user. For example, the messaging platform may send a request to the client (i.e., the device that the user is using to interact with the messaging platform) in order to obtain the payment information from the user. In one embodiment of the invention, the payment information may be obtained and verified by the vendor instead of the messaging platform.

In Step 225, the request to purchase the item is placed in an order queue in the order processing module. The order queue may include other purchase requests from other users, where the purchase requests may be for one or more items. Further, each purchase request is associated with a time stamp or sequence number that indicates when it was placed in the queue.

In Step 227, the messaging platform segments the queue by timestamp, sequence number, and/or by the number of requests and selects a processing frame/window, where the processing window is associated with one or more purchase requests. The messaging platform may be configured to process all requests within one processing frame before moving on to the next processing frame. In another embodiment of the invention, the order in which purchase requests are processed in the queue may be determined based an importance score of the order. For example, orders with greater transaction value, volume, etc., may be filled first. Those skilled in the art would appreciate that the means for filling the orders are not limited so long as orders placed can be filled by vendors.

In Step 229, the messaging platform issues the purchase request(s) the vendor in order for the vendor to complete the transaction. The purchase requests in the processing frame may be sent to the vendor as a batch request or alternatively may be sent to the vendor serially. The processing by the vendor may include attempting to complete the transaction. The purchase request may be successfully processed or unsuccessfully processed. Regardless of whether the purchase request was successfully or unsuccessfully processed, the vendor system sends a response for each of the purchase requests. The responses may be transmitted individual or in batch. The response may also include the current inventory available at the vendor for each item included in the response. For example, the response may indicate that the current inventory of the vendor for a given item is 500 units.

In Step 231, the response for the purchase request is received by the notification module (see e.g., FIG. 1), the notification module may subsequently issues a notification with the result of the processing of the purchase request to the user. The notification may take any form, e.g., a message via the messaging platform, a text message, an email, any other type of message, or any combination thereof.

Figure 3A:
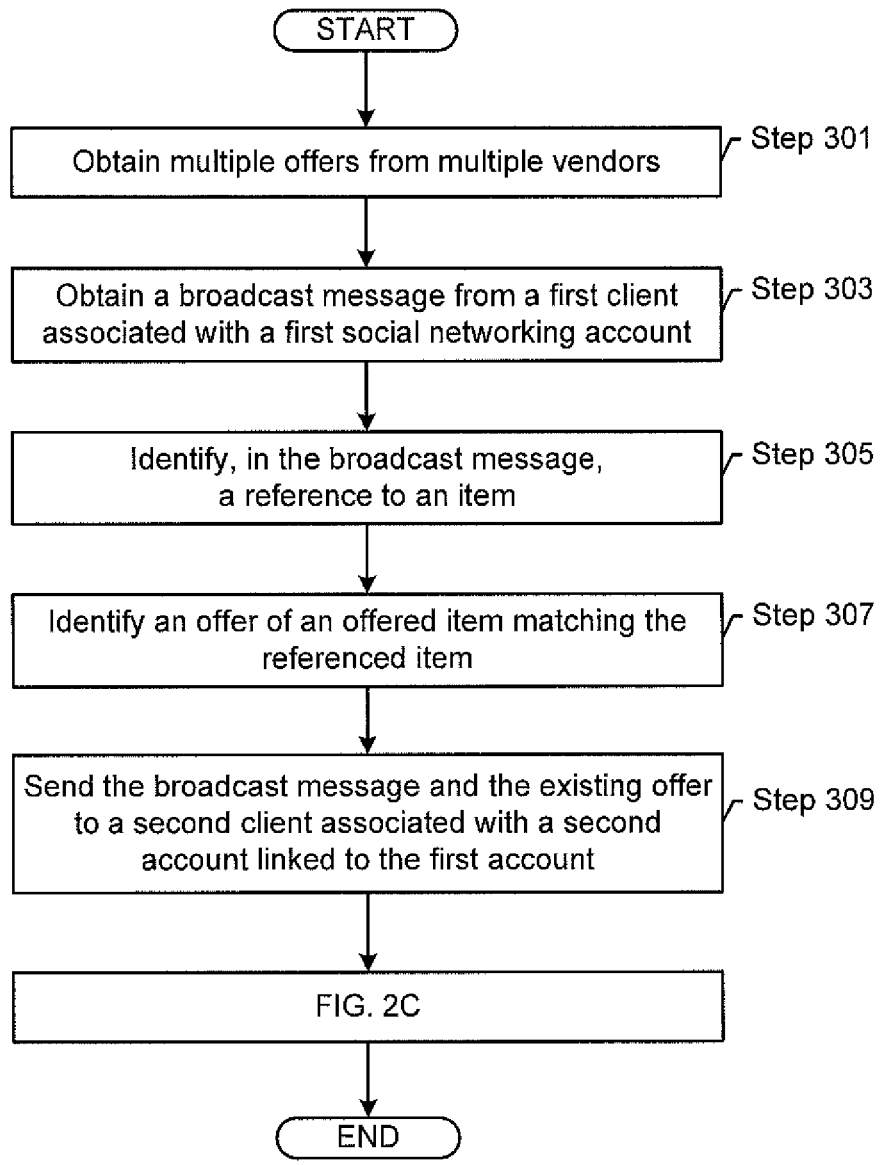
FIG. 3A shows a flowchart in accordance with one or more embodiments of the invention.
Figure 3B:
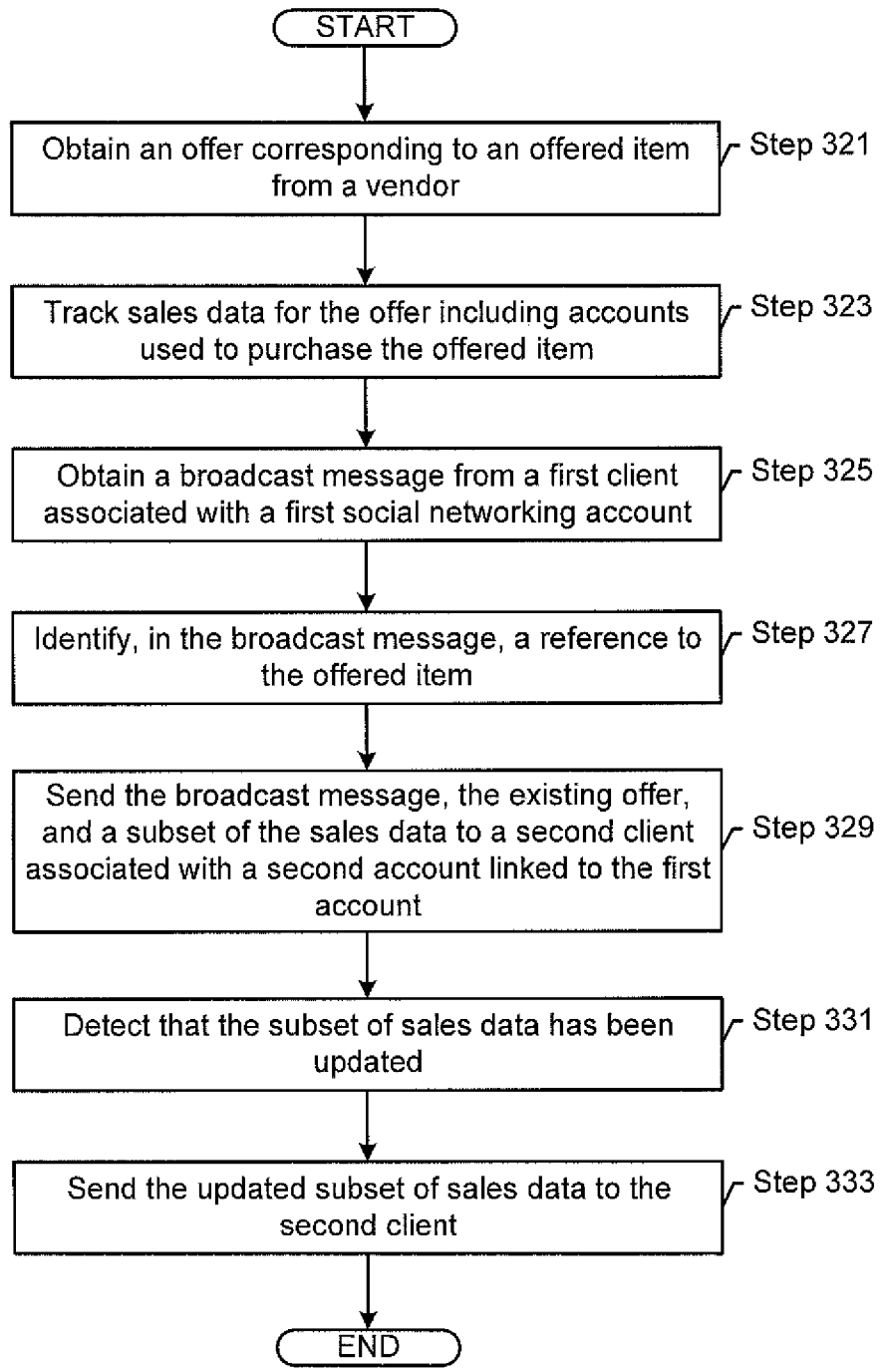
FIG. 3B shows a flowchart in accordance with one or more embodiments of the invention.

FIGS. 3A and 3B show various exemplary implementations of one or more embodiments of the invention.

Referring to FIG. 3A, in Step 301, multiple offers for sale are obtained from multiple vendors (e.g., using the methods described above). The messaging platform may generate a product card and a buy-now card for each of the offers obtained in step 301.

In Step 303, a broadcast message is obtained from a first client associated with a first social networking account. For example, a user of the first client drafts and transmits a broadcast message to the messaging platform, where the user of the first client intends the broadcast message to be sent to all of her "followers" (i.e., other users that subscribe to broadcast messages from a particular user). In this example, the user that created the broadcast message did not include a buy-now card or product card when creating the original broadcast message.

In Step 305, a reference to a commercial item in the broadcast message is identified. In Step 307, the commercial item referenced in the broadcast message is matched to an offered item corresponding to a sales offer obtained in Step 301.

In Step 309, a broadcast message with either a product card or a buy-now card is generated, where the product card or the buy-now card (which ever is present in the broadcast message) corresponds to the offer identified in Step 307. The generated broadcast message is sent to a second client associated with a second account linked to or otherwise associated with the first account. The user of the second client may interact with the broadcast message in accordance with FIG. 2c when the received broadcast message includes a buy-now card.

FIG. 3B shows a flowchart for promoting an offer for sale via a social network, in accordance with one or more embodiments of the invention. In Step 321, an offer for sale corresponding to an offered item is obtained from a vendor. In Step 323, sales data for the offer is tracked, including accounts that have accepted offers for sale of the offered item.

In Step 325, a broadcast message is obtained from a first client associated with a first social networking account. In Step 327, a reference to the offered item in the broadcast message is identified.

In Step 329, a new broadcast message is generated that includes a buy-now card for the offer obtained in step 321, and a subset of the sales data for the offer are sent to a second client associated with a second account linked to or otherwise associated with the first account. The subset of sales data may corresponds to the number of accounts associated with the first account that has issued purchase requests for the item.

In Step 331, it is detected that the subset of the sales data for the offer has been updated. In Step 333, the updated subset of the sales data is sent to the second client.

The follow section describes various examples in accordance with one or more embodiments of the invention. The examples are not intended to limit the scope of the invention.

Example 1.

The following example is for explanatory purposes only and not intended to limit the scope of the invention.

Clothes for Bros, Inc. ("Clothes") sells contemporary men's clothing at discounted prices online. Clothes contacts a popular social networking company and submits information corresponding to multiple offers that they want promoted via the social network. The information is stored in the data repository.

Aloysius, Buffy, and Curtis each have an account with the social network and use mobile phones to access their respective accounts. All of their accounts are linked (i.e., Aloysius, Buffy, and Curtis are "friends" within the social network). Aloysius has just purchased a new pair of Air Jacksons, a popular athletic shoe. Aloysius logs into his account via the social networking application and drafts a broadcast message including a photo of his new shoes and the text "Just bought the new Air Jacksons." Aloysius then submits the broadcast message and his mobile phone sends the message to the messaging platform.

The broadcast module receives the broadcast message, parses it, and performs natural language processing on the message to identify the reference to the product Air Jacksons. The sales engine compares the referenced Air Jacksons to the offered items corresponding to each offer for sale stored in the data repository. It is determined that the identified reference matches an offer for sale of pairs of Air Jacksons submitted by Clothes. The sales engine also retrieves sales data for the offer indicating that 1,000 individuals have purchased Air Jacksons via the social network.

The broadcast module sends to Buffy and Curtis the message posted by Aloysius together with the Air Jacksons offer, a component allowing for purchase of the product, and the sales data. Buffy's device displays the above items and Buffy decides that, since the shoes are so popular, she must have a pair as well. Buffy clicks on the purchase component and enters her payment information, and a request is sent to the messaging platform to transact a sale of the Air Jacksons. The messaging platform communicates with the vendor and/or payment platform to consummate the sale.

The sales engine then detects that sales data has changed with respect to the Air Jackson offer now that Buffy has made a purchase. Because Curtis's account is linked to Buffy's account, the broadcast engine sends the updated sales data to Curtis's mobile, and the mobile updates the displayed content from Aloysius to indicate that Curtis's friend Buffy has also purchased the product.

Example 2. Inventory Count Update

In this example, assume that time A is before time B, which is before time C, and so on. For this example, consider a scenario in which Don broadcasted a message on a messaging platform that he had just bought a pair of Air Jacksons. Emma and Kevin, who are followers of Don see the message and were each presented with a buy-now card for Air Jacksons. At time A, before Don broadcasted the message, the messaging platform had a cached count inventory of 1,000 Air Jacksons. Thus, the perceived inventory count at time A is 1,000 Air Jacksons. Further, in this example, assume that the actual inventory held by vendors selling Air Jacksons is indeed 1,000 at time A.

At time B, after a broadcast message with a buy now cards is received by Emma and Kevin, the messaging platform adjusts the perceived inventory count to 998 Air Jacksons, taking into account the assumption that that Emma and Kevin would both purchase Air Jacksons via the buy-now card. At time C, Kevin purchases Air Jacksons and, upon purchase confirmation, the vendor informs the messaging platform that there is actually now 879 Air Jacksons left (some were sold via channels other than the messaging platform and/or other Air Jacksons were sold via buy-now cards from other users of the messaging platform). At time C, the perceived inventory count is updated to 879.

At time D, the messaging platform fetches the inventory count from the vendor (via an API call), which is now at 925. At time D, the messaging platform updates the perceived inventory to 925. At time E, Gaby and Roger, who are followers of Kevin but are not necessarily followers of Don, both see that Kevin purchased his Air Jacksons and were each provided with an Air Jacksons buy-now card. At time E, the perceived inventory is updated to 923. At time F, a predetermined amount of time after inactivity from Gaby and Roger (neither of whom have purchased Air Jacksons), the perceived inventory is returned to 925.

Example 3. Distribution of Buy-Now Cards I

Consider a scenario in which Sam has just purchased a pair of Air Jacksons. Sam submits a broadcast message of his purchase via the messaging platform. The messaging platform recognizes, from his broadcast message, that he has just purchased a pair of Air Jacksons. Further consider that the messaging platform has a perceived inventory count of 500 and that Kevin has 1,200 followers.

To prevent Kevin's followers from being disappointed when they try to purchase Air Jacksons using the buy-now card and find out that they are actually not available, the messaging platform at most sends 500 buy-now cards to Kevin's followers. The 500 buy-now cards may be distributed randomly to 500 of the 1200 followers. Alternatively, the 500 buy-now cards may be distributed depending on the activity of these users. In one embodiment of the invention, if Jim (one of Kevin's 1200 followers) has not been on the messaging platform for over a predetermined amount of time, he or she may not be given a buy-now card. In another embodiment of the invention, the 500 buy-now cards may be distributed to the 500 active users of the messaging platform. In another embodiment of the invention, the 500 buy-now cards may be distributed to those who have the highest click-through rates (that is, 500 followers of Kevin who are most likely to click on the "Buy Now" button of the buy-now card). The click through rates may be determined by the interests of the individual followers, past click through rates for similar items, etc. The remaining 700 users who follow Kevin are provided with product cards.

After a predetermined amount of time, assuming that 100 followers have purchased Air Jacksons and the remaining 400 followers made no interaction with the buy-now cards, the messaging platform may be configured to send buy-now cards to 400 more other followers of Kevin (i.e., to the users that were following Kevin but had previously only received a product card). This process may be repeated until the perceived inventory at the vendor is zero.

Example 4. Distribution of Buy-Now Cards II

Consider a scenario in which Sam has just purchased a pair of Air Jacksons. Sam submits a broadcast message of his purchase via the messaging platform. The messaging platform recognizes, from his broadcast message, that he has just purchased a pair of Air Jacksons. Further consider that the messaging platform has a perceived inventory count of 500 (that is, the messaging platform estimates that there its vendors have at least 500 pairs of Air Jacksons) and that Kevin has 15,000 followers.

The messaging platform may determine that, overall, Kevin's followers have a click through rate of 5%. Thus, if a buy-now card is distributed to all 15,000 followers, at least 750 (15,000*0.05) followers will purchase Air Jacksons via the buy-now card. However, because the perceived inventory count, 500, is less than 750, the messaging platform may, instead, only broadcast Sam's broadcast message as a buy-now card to 10,000 (10,000*0.05=500) of his followers. The users who receive the buy-now cards may be selected in a manner described in Example 3. The remaining 500 users may receive a product card.

Figure 4:
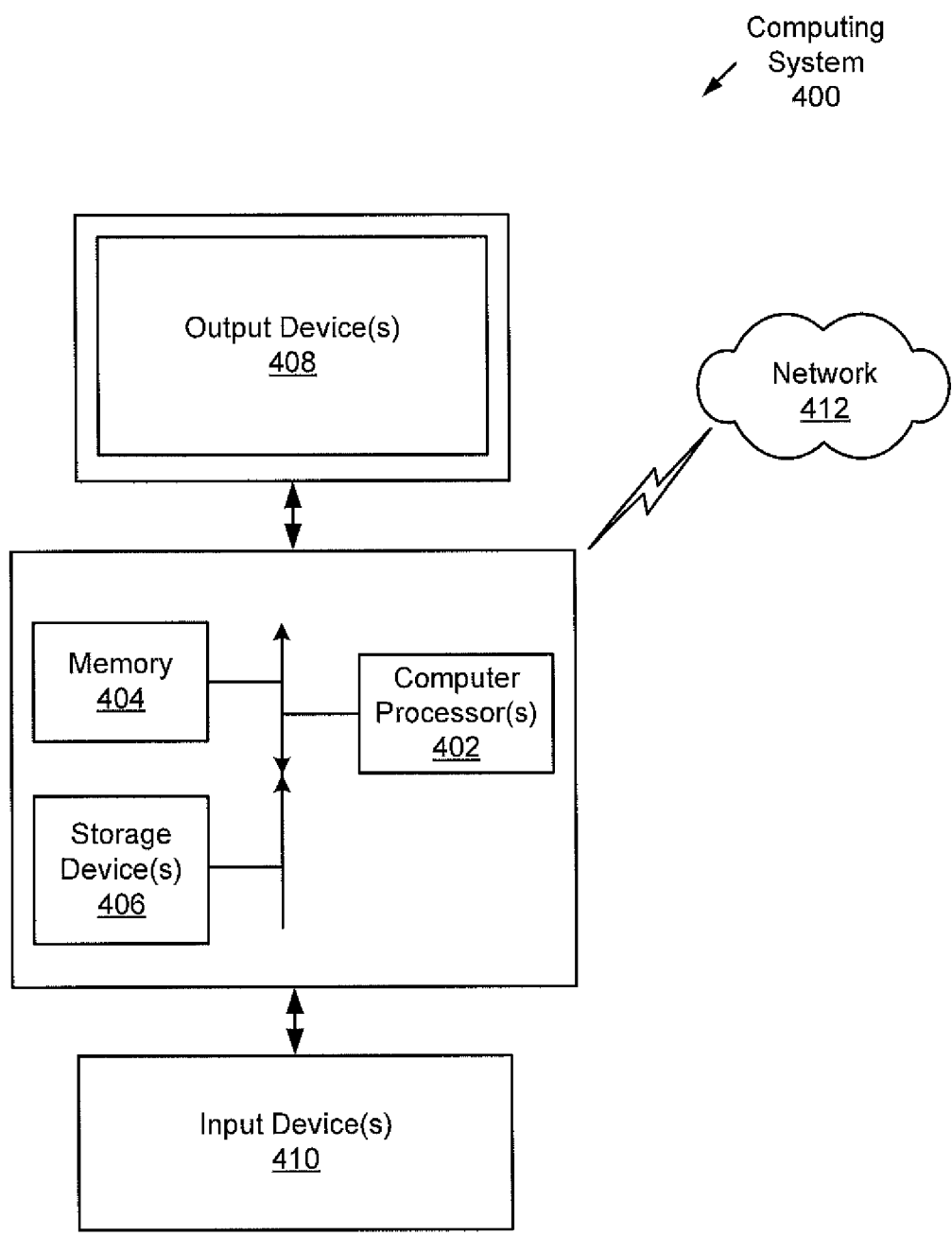
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method for processing purchase requests on a messaging platform hosting a plurality of social networking accounts, the method comprising:
   generating a perceived inventory count representing how many units of an item a vendor has available for sale, wherein generating the perceived inventory count comprises:
      obtaining, from the vendor, inventory information comprising an actual inventory count for the item, and
      updating the perceived inventory count with the actual inventory count:
   receiving a first message from a first client device associated with a first social networking account of the plurality of social networking accounts;
   identifying the item from a reference to the item in the first message;
   determining that the perceived inventory count for the item is greater than zero;
   in response to determining that the perceived inventory count for the item is greater than zero, generating a second message comprising data that when processed by a client device operable to process the data, causes the client device to display a buy-now card on a display of the client device;
   transmitting the second message to respective client devices of one or more second accounts of the plurality of social networking accounts, wherein the one or more second accounts are connected to the first account by a social graph representing connections between the plurality of social networking account;

receiving, after transmitting the second message, one or more purchase requests for the item from the one or more second accounts; and processing, by the messaging platform, the one or more purchase requests, comprising updating the perceived inventory count for the item with a difference between the perceived inventory count and a number representing a total quantity of the one or more purchase requests received after transmitting the second message.

2. The method of claim 1, further comprising:
sending a request for updated inventory information to the vendor;
receiving the updated inventory information, the updated inventory information comprising an updated inventory count for the item from the vendor; and
updating the perceived inventory count with the updated inventory count.

3. The method of claim 2, further comprising:
sending, after updating the perceived inventory count, the one or more purchase requests to the vendor;
receiving a response to the one or more purchase requests from the vendor, the response comprising a second actual inventory count; and
updating the perceived inventory count with the second actual inventory count for the item.

4. The method of claim 1, wherein the buy-now card comprises a user-selectable button that when selected by a user of the client device, causes the client device to send a purchase request for the item to the messaging platform.

5. The method of claim 1, further comprising:
in response to determining that the perceived inventory count for the item is not greater than zero:
generating a third message comprising product data that when processed by the client device causes the client device to render a product card on the display of the client device, wherein the product card comprises information about the item, and
transmitting the third message to the respective client devices of the one or more second accounts of the plurality of social networking accounts.

6. The method of claim 1, further comprising:
adjusting the perceived inventory count based on a historical click through rate of buy-now cards for the one or more second accounts.

7. The method of claim 1, further comprising:
tracking sales data associated with the item, the sales data comprising information about accounts of the plurality of social networking accounts used to purchase the item prior to generating the second message; and
wherein the second message further comprises at least a portion of the sales data.

8. The method of claim 7, further comprising:
updating the sales data with information about the one or more second accounts; and
transmitting a third message comprising the updated subset of the sales data to the respective client devices of the one or more second accounts.

9. The method of claim 7, wherein the portion of the sales data comprises information about one or more third accounts in the plurality of the social networking accounts used to purchase the item, wherein each of the one or more third accounts are connected to at least one of the one or more second accounts on the social graph.

10. The method of claim 1, wherein the first message comprises text, and wherein identifying the item from a reference to the item in the first message comprises performing natural language processing on the text of the first message to identify the reference to the item from the text of the first message.

11. The method of claim 1, wherein the reference to the item is a URL to a web resource comprising information about the item, wherein identifying the item from the reference to the item in the first message comprises:
scraping the information about the item from the web resource corresponding to the URL to identify the item.

12. A non-transitory computer readable medium comprising instructions, which when executed by a processor perform a method, the method comprising:
generating a perceived inventory count representing how many units of an item a vendor has available for sale, wherein generating the perceived inventory count comprises:
obtaining, from the vendor, inventory information comprising an actual inventory count for the item, and
updating the perceived inventory count with the actual inventory count;
receiving a first message from a first client device associated with a first social networking account of the plurality of social networking accounts;
identifying the item from a reference to the item in the first message;
determining that the perceived inventory count for the item is greater than zero;
in response to determining that the perceived inventory count for the item is greater than zero, generating a second message comprising data that when processed by a client device operable to process the data, causes the client device to display a buy-now card on a display of the client device;
transmitting the second message to respective client devices of one or more second accounts of the plurality of social networking accounts, wherein the one or more second accounts are connected to the first account by a social graph representing connections between the plurality of social networking accounts;
receiving, after transmitting the second message, one or more purchase requests for the item from the one or more second accounts; and
processing, by the messaging platform, the one or more purchase requests, comprising updating the perceived inventory count for the item with a difference between the perceived inventory count and a number representing a total quantity of the one or more purchase requests received after transmitting the second message.

13. The non-transitory computer readable medium of claim 12, wherein the method further comprises:
sending a request for updated inventory information to the vendor;
receiving the updated inventory information, the updated inventory information comprising an updated inventory count for the item from the vendor; and
updating the perceived inventory count with the updated inventory count.

14. The non-transitory computer readable medium of claim 13, wherein the method further comprises:
sending, after updating the perceived inventory count, the one or more purchase requests to the vendor;
receiving a response to the one or more purchase requests from the vendor, the response comprising a second actual inventory count; and updating the perceived inventory count with the second actual inventory count for the item.

15. The method of claim 1, wherein a total quantity of the one or more second accounts does not exceed the perceived inventory count.

16. The computer readable medium of claim 12, wherein a total quantity of the one or more second accounts does not exceed the perceived inventory count.

17. A system comprising:
one or more computers and one or more storage devices on which are stored instructions that are operable, when executed by the one or more computers, to cause the one or more computers to perform operations comprising:
generating a perceived inventory count representing how many units of an item a vendor has available for sale, wherein generating the perceived inventory count comprises:
obtaining, from the vendor, inventory information comprising an actual inventory count for the item, and
updating the perceived inventory count with the actual inventory count;
receiving a first message from a first client device associated with a first social networking account of the plurality of social networking accounts;
identifying the item from a reference to the item in the first message;
determining that the perceived inventory count for the item is greater than zero;
in response to determining that the perceived inventory count for the item is greater than zero, generating a second message comprising data that when processed by a client device operable to process the data, causes the client device to display a buy-now card on a display of the client device;
transmitting the second message to respective client devices of one or more second accounts of the plurality of social networking accounts, wherein the one or more second accounts are connected to the first account by a social graph representing connections between the plurality of social networking accounts;
receiving, after transmitting the second message, one or more purchase requests for the item from the one or more second accounts; and
processing, by the messaging platform, the one or more purchase requests, comprising updating the perceived inventory count for the item with a difference between the perceived inventory count and a number representing a total quantity of the one or more purchase requests received after transmitting the second message.

18. The system of claim 17, wherein a total quantity of the one or more second accounts does not exceed the perceived inventory count.

19. The system of claim 17, wherein the operations further comprise:
sending a request for updated inventory information to the vendor;
receiving the updated inventory information, the updated inventory information comprising an updated inventory count for the item from the vendor; and
updating the perceived inventory count based on the updated inventory count.

20. The system of claim 17, wherein the operations further comprise:
in response to determining that the perceived inventory count for the item is not greater than zero:
generating a third message comprising product data that when processed by the client device causes the client device to render a product card on the display of the client device, wherein the product card comprises information about the item, and
transmitting the third message to the respective client devices of the one or more second accounts of the plurality of social networking accounts.

* * * * *

UNITED STATES PATENT AND TRADEMARK OFFICE
CERTIFICATE OF CORRECTION

| | |
|---|---|
| PATENT NO. | : 10,902,497 B1 |
| APPLICATION NO. | : 14/835493 |
| DATED | : January 26, 2021 |
| INVENTOR(S) | : Virmani et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,125 days.

Signed and Sealed this
Sixth Day of September, 2022

Katherine Kelly Vidal
*Director of the United States Patent and Trademark Office*